H. R. FISCHER ETAL 3,322,395

POWER OPERATED DUCT RODDER

Filed June 22, 1965

INVENTORS:
LIVIO F. MARCANTONIO
HOWARD R. FISCHER

BY
Stephen J. Rudy
ATTORNEY

H. R. FISCHER ETAL 3,322,395

POWER OPERATED DUCT RODDER

Filed June 22, 1965

INVENTORS:
LIVIO F. MARCANTONIO
HOWARD R. FISCHER

BY Stephen J. Rudy

ATTORNEY

May 30, 1967 H. R. FISCHER ETAL 3,322,395
POWER OPERATED DUCT RODDER
Filed June 22, 1965
5 Sheets-Sheet 5

FIG. 12.

INVENTORS:
LIVIO F. MARCANTONIO
HOWARD R. FISCHER
BY
Stephen J. Rudy
ATTORNEY

United States Patent Office 3,322,395
Patented May 30, 1967

3,322,395
POWER OPERATED DUCT RODDER
Howard R. Fischer, New Hartford, and Livio F. Marcantonio, Utica, N.Y., assignors to Chicago Pneumatic Tool Company, New York, N.Y., a corporation of New Jersey
Filed June 22, 1965, Ser. No. 465,990
19 Claims. (Cl. 254—134.6)

This invention is concerned with a power operated duct rodder for threading or carrying a cable lead line through an elongated narrow duct or passage.

Upon completion of this operation a heavy cable is tied to one end of the lead line and is drawn through the duct as the lead line is pulled out of the other end of the duct.

A further object is to provide a duct rodder which may be operated to travel selectively in either direction in a duct.

In accordance with the invention a duct rodder of this nature is provided comprising: an elongated housing of lesser diameter than the duct having an axially extending piston chamber, a pneumatically operable piston movable in the chamber relative to the housing having a piston rod projecting externally of the forward end of the housing, a first duct gripping means mounted to the forward end of the rod for gripping the duct and holding the piston stationary when operating air is applied to the piston chamber forwardly of the piston so as to allow a forward advance of the housing relative to the piston, a second duct gripping means mounted to the rear end of the housing for gripping the duct and holding the housing stationary when operating air is applied to the piston chamber rearwardly of the piston so as to allow a forward advance of the piston relative to the housing, an operating air supply line connected to the rear end of the housing, a distributing valve chamber in the housing having intermediately of its ends a main passage connection with the supply line, a distributor valve pneumatically shiftable in the valve chamber for causing flow of operating air alternately to opposite ends of the piston chamber, and a drag valve movable as a unit with the piston controlling pneumatic shifting of the distributor valve.

A feature of the invention lies in an arrangement of valves, one of which fuctions alternately to distribute operating fluid to and to exhaust spent air from opposite ends of the piston chamber, and another of which functions automatically in response to movement relatively of the piston and housing to control the operation of the distributing valve.

A further feature of the invention lies in the nature of the gripping means. This includes a duct gripping element or elastomer formed of resilient flexible material, whereby under one condition of operation it is caused to flex inwardly relative to the duct wall and thereby may be slidably advanced in the duct, and in another condition of operation is caused to flex or expand outwardly to firmly grip the duct wall and thereby act to resist its being advanced in the duct.

A further feature of the gripping element lies in its structure whereby it may be flexed in either direction relative to the duct. This feature enables the duct rodder having gripping elements mounted fore and aft to be operated to travel selectively in either direction in a duct.

A further feature of the invention lies in the structure and mounting arrangement of the forward and rear gripping means, whereby the forward gripping means has a greater holding power than the rear gripping means relative to the duct wall. This feature is of decided advantage in that it obtains for each gripping means only the gripping power necessary to hold, as the case may be, the housing or the piston stationary to enable relative advancement of the other.

In the accompanying drawings.

The duct rodder illustrated in the accompanying drawings includes an elongated housing 20 of relatively lesser diameter than the duct 21 in which it is to be received. It has in its forward end an axial recess 22 in which is fitted a piston cylinder 23. The rear end of the cylinder abuts against a thick disc 24 rigidly seated upon a complementary annular shoulder 25 at the bottom of the recess. The cylinder defines a piston chamber 26 in which a piston 27 is pneumatically reciprocable. The piston has an elongated piston ram or rod 28 which extends axially through an annular gland 29. The latter abuts the forward end 30 of the cylinder. A plug 31 screwed into the forward end of the housing has a terminal flange 32 abutting a corresponding end wall 33 of the housing. A group of adjustable screws 34, two being shown, screwed through the plug are pressed against the gland, whereby the cylinder 23 is held rigidly seated against the disc 24. The plug has an axial hole, the wall of which sleeves a stem 36 of the gland. A bushing 37 press fitted into the gland serves as a supporting bearing for the reciprocable piston rod. Suitable sealing means 38 fitted in the gland about the piston rod seals the piston chamber against air leakage around the piston rod. An O-ring seal 39 is also provided about the periphery of the gland to seal against air leakage from the piston chamber.

Mounted externally of the housing upon a forwardly projecting end of the piston rod is a first duct gripping means or duct gripper assembly 40. This includes an adapter 41 which sleeves a reduced terminal end of the piston rod and abuts at its rear against a shoulder 42. The adapter has a reduced cylindrical stem portion 43 which extends into a complementary axial hole 44 formed in the body of a duct gripping element or gripper 45. The rear face of the gripper abuts an annular shoulder 46 of the adapter. A thick washer 47 sleeving the piston rod has a rear annular face 48 opposing the forward face of the gripper. The gripper is retained between the adapter and washer by means of a nut 49 screwed upon the piston rod.

The gripper 45 (FIGS. 1 and 2) is of circular configuration having front and rear parallel faces 52, 53. It further includes a group of legs 54, here six in number, spaced circumferentially equally apart and extending radially from a central main body portion 55. The gripper is formed of flexible resilient material whereby the leg members are flexible under pressure in either direction away from a normal radial condition, and are flexible to their normal radial condition when such pressure is relieved. Here the gripper is formed of a tough wear resistant plastic. Plastic material known by the name of urethane is suitable for this purpose. So as not to interfere with flexing of the legs, the central area 55 of the gripper extends radially beyond the periphery of the washer and adapter elements 47, 41. Further, the diameter of the washer 47 located at the front of the gripper is a little greater than the diameter of the annular shoulder 46 of the adapter at the rear of the gripper, and the latter shoulder is of slight radial extent. This arrangement is desired as it permits not only flexing of the legs but also flexing of a portion of the central body area of the gripper in a rearward direction; and, because of the greater radial expanse of the front washer relative to the shoulder 46, this arrangement allows lesser flexing of the legs and body area in a forward direction.

The gripper 45 is of slightly greater outer diameter than the diameter of the duct 21 in which it is received. When the gripper assembly is entered forwardly into the duct, the leg elements 54 are forced by the surrounding wall of the duct to flex rearwardly, as indicated by the broken line 56 in FIG. 1. It can be seen that, when axial pressure is applied in a forward direction to the gripper assembly, the gripper will slide forwardly over the duct wall. In this action the tension of the legs against the duct due to the inherent resilience of the gripper material provides a slight but negligible frictional resistance to forward movement of the gripper. The forward peripheral edge 57 of each leg is beveled. This is desired, so that when the legs are flexed rearwardly as in FIG. 1, the beveled surfaces of the legs contact the duct wall, thus allowing easier sliding of the gripper forwardly relative to the duct. This beveled surface also serves as a pilot in facilitating initial entry of the gripper into the duct. The beveled surface has a still further advantage, as will later appear.

Figure 1:
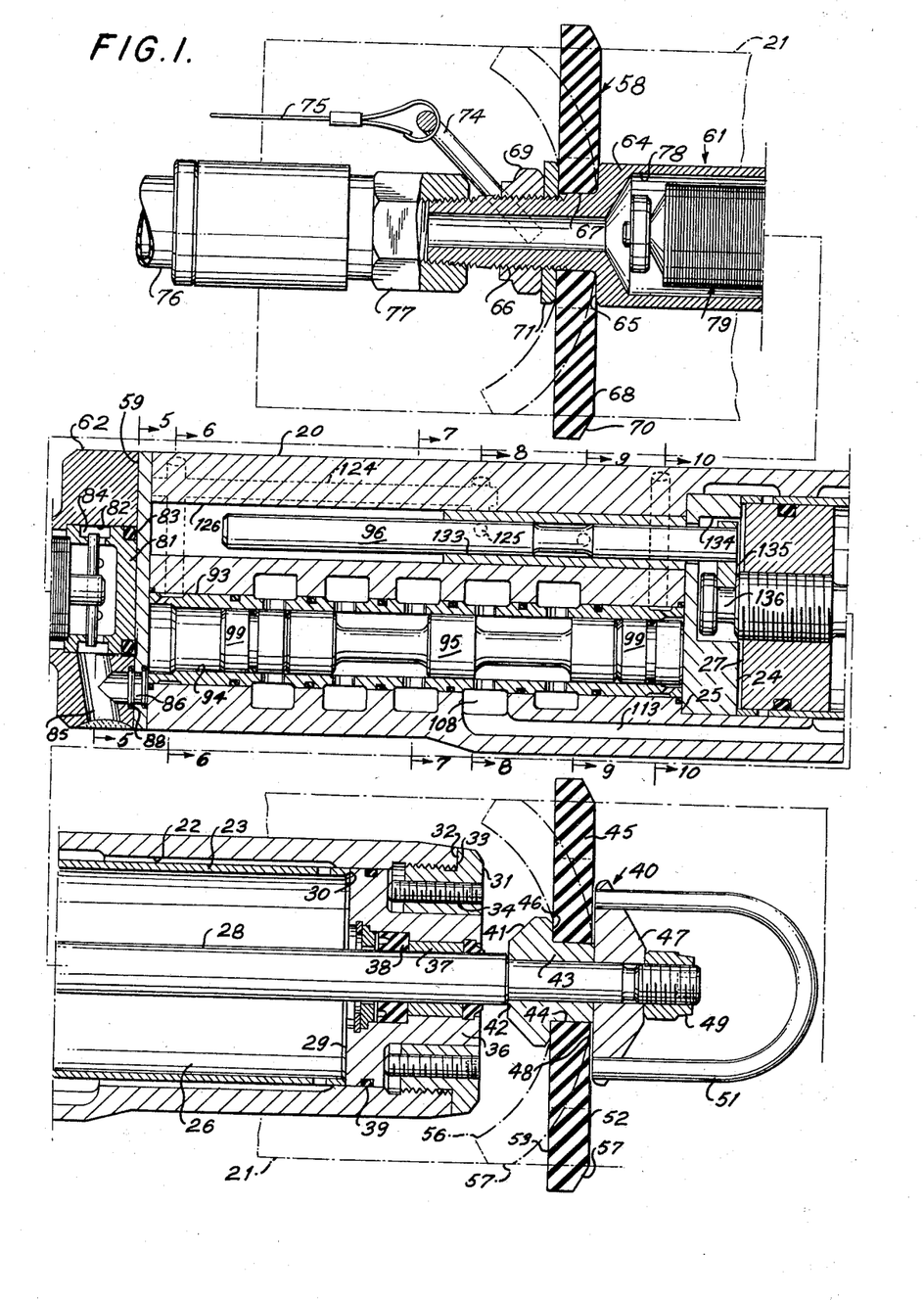
FIG. 1 is a longitudinal section through the duct rodder illustrating the invention.
Figure 2:
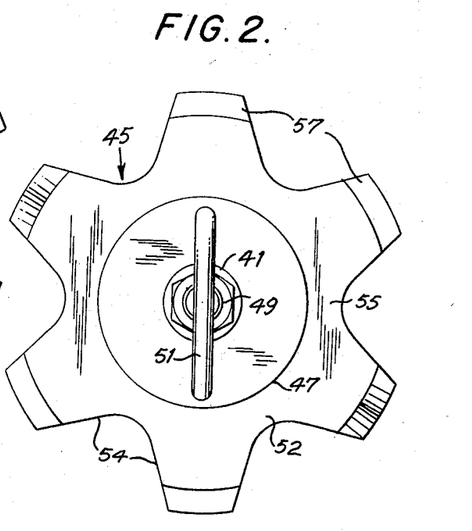
FIG. 2 is a front or right end view of FIG. 1.

It can further be seen that, when pressure is applied axially in a rearward direction to the gripper while its legs are in a rearwardly flexed condition, the washer element 47 acts over the central body area of the gripper to force the body as well as the legs to flex or expand outwardly. This causes the legs to firmly grip the surrounding wall of the duct and thereby resist rearward movement of the gripper assembly under the applied pressure. In this gripping action, the beveled surface 57 of each leg provides a broader gripping surface in contact with the duct wall than would otherwise be provided by a sharp peripheral corner edge of the leg.

Figure 3:
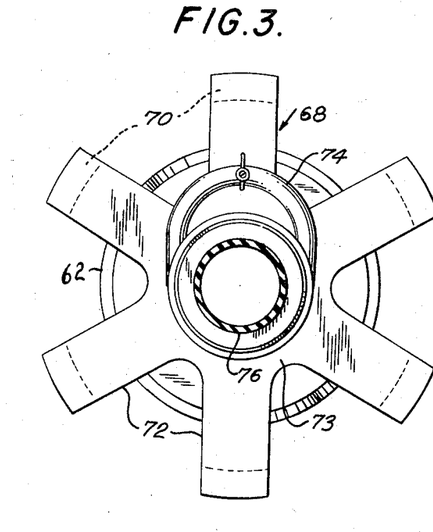
FIG. 3 is a rear or left end view of FIG. 1.
Figure 4:
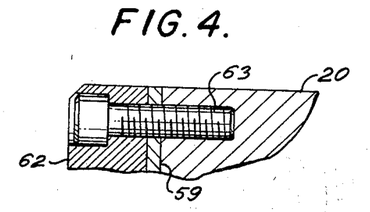
FIG. 4 is a detail showing one of the bolts mounting the rear gripper assembly to the housing.
Figure 5:
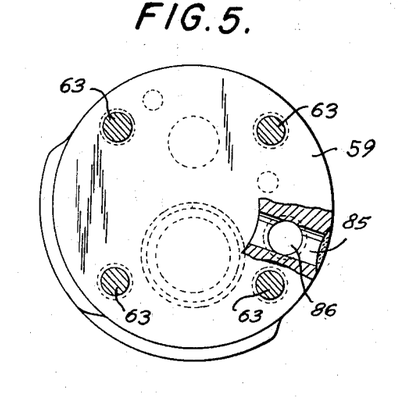
FIG. 5 is a cross section on the irregular line 5—5 of FIG. 1.
Figure 6:
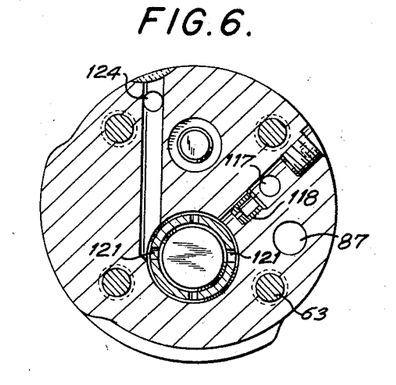
FIG. 6 is a cross section on line 6—6 of FIG. 1.
Figure 7:
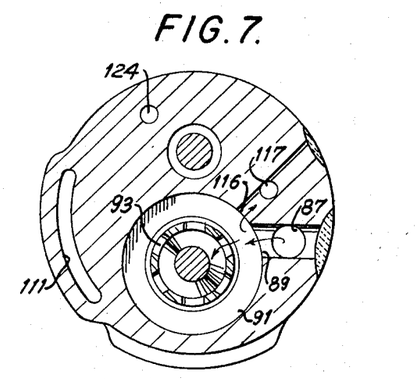
FIG. 7 is a cross section on line 7—7 of FIG. 1.
Figure 8:
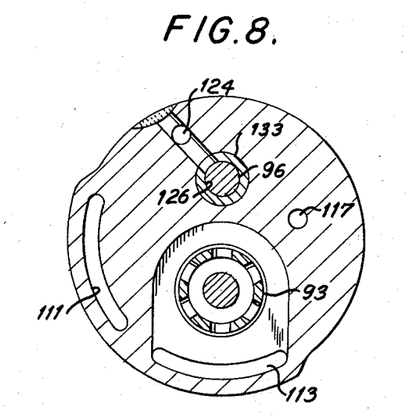
FIG. 8 is a cross section on line 8—8 of FIG. 1.
Figure 9:
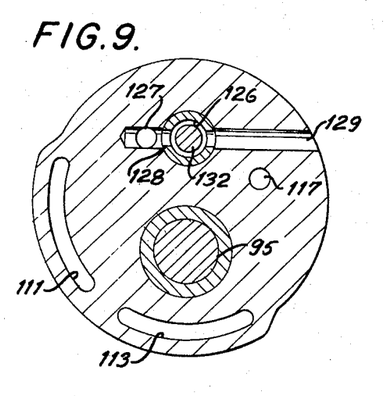
FIG. 9 is a cross section on line 9—9 of FIG. 1.
Figure 10:
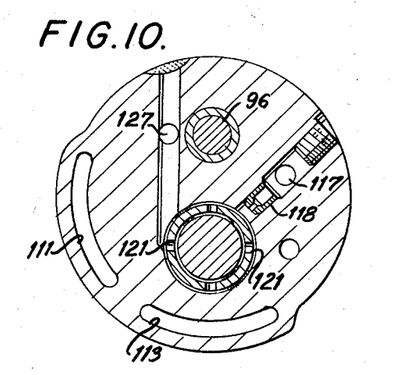
FIG. 10 is a cross section on line 10—10 of FIG. 1.

A second duct gripping means or duct gripper assembly 58 (FIGS. 1, 3) is mounted to the opposite or rear end of the housing. This assembly includes a circular spacer or closure plate 59 lying flat upon the rear end wall of the housing. Adjoining the closure plate is a gripper support 61. This includes a head section 62 which lies flush upon the closure plate. A group of bolts 63 (FIGS. 4–6) screwed fast into the end wall of the housing, rigidly hold the housing, closure plate, and gripper support to one another. Extending axially rearward from the head section is a reduced cylindrical portion 64 having an annular shoulder 65 at its end. Extending axially beyond this shoulder is an externally threaded pipe section 66. The latter extends with a slide fit through an axial hole 67 of a gripper element 68. A nut 69 screwed upon the pipe section 66, together with a washer 71 pressed against the rear face of the gripper 68 holds the latter in rigid abutment with the annular shoulder 65.

This rear gripper 68 is substantially similar to the forward one. It is of similar outer diameter, and is also formed of the same resilient flexible material. It also has a group of six legs 72 beveled at their peripheral inner edges 70. These legs are, however, of uniform circumferential width, and are narrower than the legs 54 of the forward gripper. The legs 54 of the forward gripper, as appears in FIG. 2, diverge outwardly from the body area 55. The body area of the forward gripper is also of greater diameter than the body area 73 of the rear gripper. Further, it is noted that the washer 71 and the opposed shoulder 65 of the rear gripper are of equal diameter. The construction and arrangement of the rear gripper as compared with that of the forward one, enables greater flexing of the legs of the rear gripper in either direction, but affords lesser gripping power of the legs against the wall of the duct.

There is an advantage in this difference in structure and arrangement of the forward and rear grippers. During operation of the device, pneumatic power is applied at one time to the rear of the piston 27 to cause the rear gripper 68 to hold the housing 20 stationary, and to advance the forward gripper 45 along with the piston. At the termination of the piston stroke a strong forward thrust is transmitted to the housing 22 which slightly overcomes the rearwardly acting force of the housing upon the rear gripper. This action serves to advance the entire duct rodder a slightly further distance into the duct. Alternately to this action, pneumatic power is applied to the forward end of the piston. The applied pressure in the latter instance causes the forward gripper 45 to hold the piston 27 stationary and causes the rear gripper 68 to advance forwardly with the housing. Because of the greater load borne by the housing as compared with that borne by the piston, the pneumatic component of force acting in a rearward direction on the piston is prevented by the strong holding characteristics of the forward gripper upon the wall of the duct from pulling the forward gripper rearwardly relative to the housing; and the housing together with the load carried by it is enabled under the component of force acting forwardly on the housing to advance relative to the piston.

The nut element 69 has fixed thereto a cable ring or bail 74 to which a cable lead wire 75 is adapted to be hooked and drawn into the duct as the rodder advances. An operating air supply hose line 76 serves to supply the device with the necessary operating air. This hose line also moves into the duct as the rodder advances. It is axially connected by means of a fitting 77 screwed on the end of the pipe section of the rodder. This hose line as well as the lead wire may extend as much as a thousand feet or more during a duct rodding operation, thus accounting for the added load borne by the housing relative to that of the piston.

Operating air flows from this hose line through the pipe extension 66 into a filter chamber 78 of the rear gripper assembly 61. Disposed in this chamber is an air filter unit 79. The latter includes a cylindrical support 81 received in a counterbore 82. This support is held by means of the closure plate 59 seated against the bottom of the counterbore. An O-ring seal 83 prevents air leakage from the filter chamber around the support 81. Air passing through the filter unit flows through a peripheral channel 84 of the filter support 81 to a passage 85 leading through the head piece 62. This passage communicates through an opening 86 in the closure plate with a main passage 87 in the housing wall. The latter passage (FIGS. 1, 6, 7, 11) leads through an inlet port 89 to an annular housing intake channel 91 and through radial ports 92 of an elongated bushing 93 to an air distributor valve chamber 94. O-rings 88 are provided at opposite ends of the opening 86 of the closure plate to seal against air leakage around the latter.

A distributor slide valve 95 and a drag valve 96 are arranged in the housing in parallel relation to each other rearwardly of the piston chamber. The distributor valve controls the flow of operating air to, and the venting of spent air from opposite ends of the piston chamber 26. The drag valve controls automatic reversing or shifting of the distributor valve from one position to another to effect such alternate flow of operating air to and venting of spent air from the piston chamber.

The distributor valve chamber 94 is defined by the interior of the bushing 93. This chamber is sealed at its rear end by the closure plate 59 and an O-ring 97. The opposite end of the distributor chamber is sealed by the disc 24 and an O-ring 98.

The distributor valve is shiftable back and forth in its chamber. It is cushioned in its movements from impacting against the closure plate 59 and the disc 24 by means of bumper plugs 99, disposed one at each end. Here, the plugs are formed of a suitable plastic, such as nylon. The plugs move as a unit with the distributor valve. While here they are not attached to the valve, they could be. An O-ring 101 about the periphery of each plug seals against leakage of operating air to either side of the plug.

Figures 11, 17:
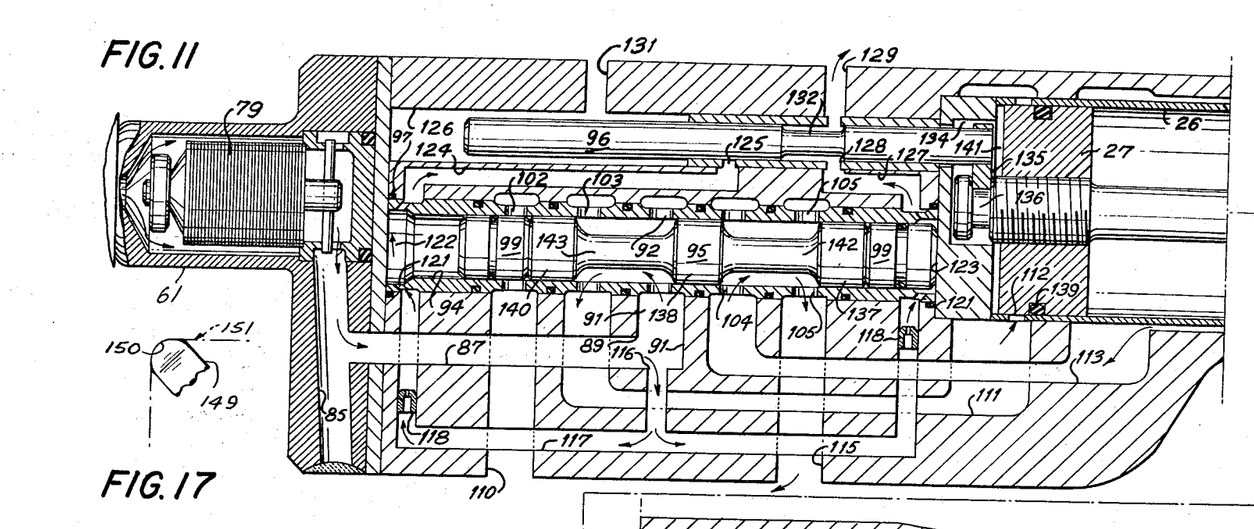
FIGS. 11 and 12 are schematic views showing respectively the returned and advanced positions of the piston relative to the housing; and further showing the various air flow passages.
FIG. 17 is a fragmentary illustration of a corner of a square duct engaged by a leg of the gripper shown in FIG. 16.
Figure 12:
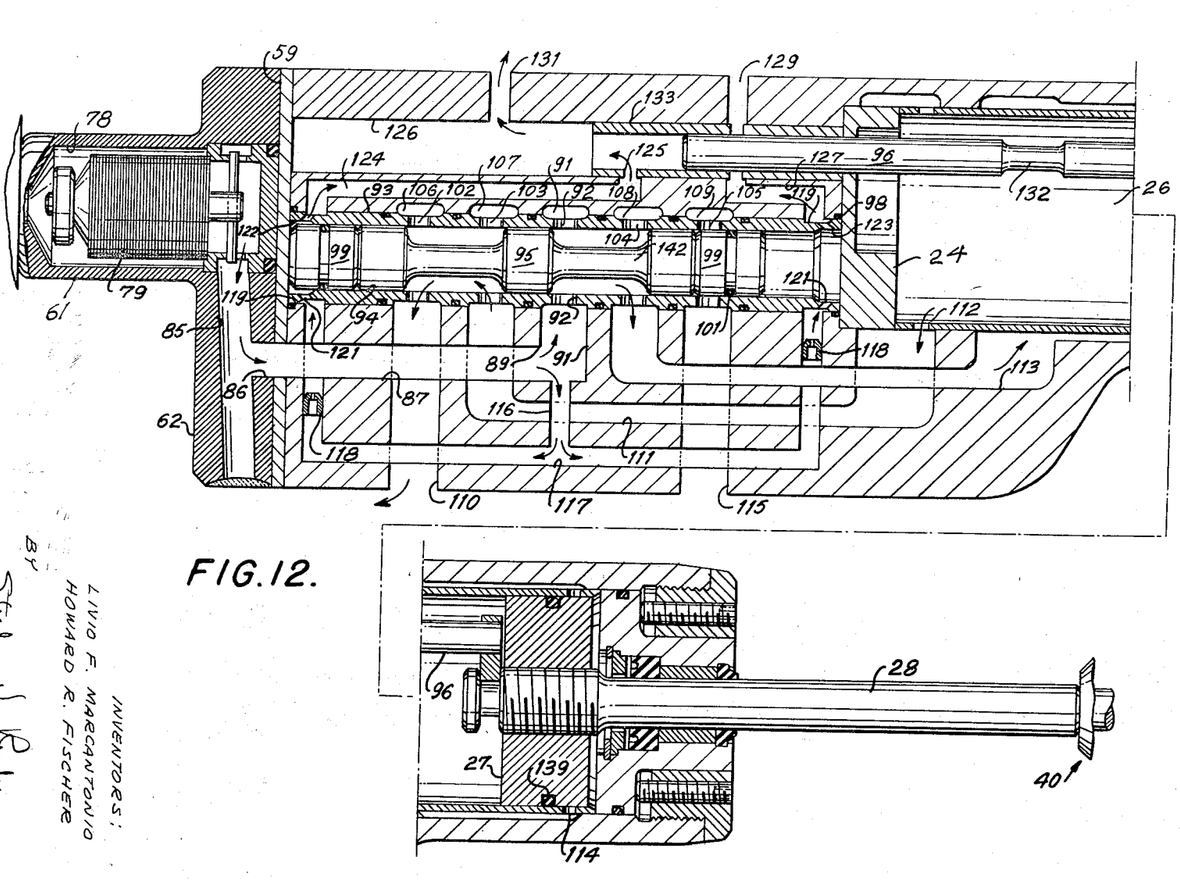

The bushing 93, as best indicated in FIGS. 11, 12, has a plurality of radial ports 102, 103, 92, 104 and 105 respectively communicating the valve chamber 94 with annular channels 106, 106, 91, 108 and 109. O-rings, as indicated, seal the channels off from one another against air leakage. Channel 106 is connected by a vent 110 to the outside of the housing. Channel 107 connects with an elongated housing intake-exhaust passage 111 which leads through radial ports 112 to the rear of the piston chamber. The intake channel 91, as earlier noted, connects through port 89 with the operating air supply main passage 87. Channel 108 connects with a second elongated housing intake-exhaust passage 113 (FIGS. 1, 11, 12) leading through radial ports 114 to the forward end of the piston chamber. And channel 109 is connected by means of a vent 115 to the outside of the housing. A port 116 (FIGS. 7, 11, 12) relatively smaller than the inlet port 89 and located close thereto connects the intake channel 91 with a control passage 117 extending through the housing wall and leading at opposite ends through reduction orifices 118 (best shown in FIGS. 6, 10, 12, 11), annular channels 119 about opposite ends of the bushing, and radial ports 121 through the bushing to opposite ends 122, 123 of the valve chamber. The left end 122 of the valve chamber is connected (FIGS. 6, 8, 11, 12) by means of the radial ports 121 and a housing passage 124 with a port 125 leading into a drag valve chamber 126. The opposite end 123 (FIGS. 10, 9, 11, 12) of the distributor valve chamber is connected to the drag valve chamber 126 by means of the radial ports 121, a passage 127 and a port 128. The drag valve chamber 126 is connected to the outside of the housing by a pair of vents 129, 131.

The drag valve 96 is in the form of an elongated rod having between its ends a neck portion 132. It is supported in a bushing 133 for reciprocable movement in the drag valve chamber 126. The bushing is press fitted in one end of the drag valve chamber. The rear end of the latter chamber is closed by the closure plate 59. A forward end of the drag valve extends through a slightly larger hole in the disc 24 into a recess 134 formed in the forward face of the disc; and it is press fitted in the body of a forked plate 135 depending in the recess. The forked plate engages about a neckpiece 136 of the piston rod extending beyond the piston into the recess 134. By means of this arrangement, the drag valve is reciprocable as a unit with the piston.

To facilitate description of the operation of the device reference is directed to FIG. 1 and to the schematic showings in FIGS. 11 and 12. It is assumed that the duct rodder has been inserted in the duct as in FIG. 1 for traveling in a forward direction, and that the gripper elements 45 and 68 are flexed rearwardly by the wall of the duct, as shown in broken line. FIGS. 1 and 11 show the piston 27 together with the connected drag valve 96 in a returned rearward position, and further show the distributor valve 95 together with the nylon end plugs 99 in forward position. In this position, the right end land 137 of the distributor valve blocks off communication of the radial ports 105 from the right end of the distributor chamber; the center land 138 blocks off communication of the radial ports 92 from the radial ports 104; and the other end land 140 blocks off the radial ports 103 from the radial ports 102.

Operating air now flowing from the supply passage 87 and inlet port 89 into the intake channel 91 flows in part through port 116, the control passage 117 and in a thin stream through the orifices 118 to opposite ends 122, 123 of the distributor valve chamber. A rearward position (FIGS. 1, 11) of the drag valve at this time seals over port 125 associated with the left end 122 of the distributor valve chamber so that air flowing to this end is blocked from passing through the drag valve chamber 126 to the vent 131. This condition causes air pressure to build up in the space at the left end of the distributor valve chamber, since the area about the neck 132 of the drag valve provides communication with the vent 129 of port 128 associated with the right end 123 of the distributor valve chamber. The unbalanced pressure condition developed at opposite ends of the distributor valve at this time holds the latter in its forward condition. Simultaneously with the flow of operating air to the ends 122, 123 of the distributor valve chamber, operating air flows in larger volume from the intake channel 91 through the radial ports 92 to the interior of the bushing around the neck 143 of the distributor valve, and then flows out through radial ports 103 to the passage 111 and connecting radial ports 112 leading to the rear of the piston chamber. There is a loose fit of the piston 27 rearwardly of the peripheral O-ring 139 enabling operating air to bleed around the piston to its rear. Due to the positioning of the radial ports 112 slightly forward of the rear of the piston chamber, the piston never moves fully to the rear end of the piston chamber because of cushioning air becoming trapped behind the piston, as at 141. Under pressure of the operating air developing at its rear the piston moves forwardly to push the forward gripper 45 a corresponding distance into the duct, while at the same time the rear gripper 68 holds the housing stationary, as earlier explained. As the piston moves forwardly, substantially all of the air trapped at the forward end of the piston chamber vents through radial ports 114, the intake-exhaust passage 113, the radial ports 104 to the interior of the bushing, around the neck 142 of the distributor valve and out through radial ports 105 to the vent passage 115.

As the piston moves forwardly, it pulls the drag valve 96 with it, causing the rear portion of the drag valve, as appears in FIG. 12, to move clear of the port 125 associated with the left end 122 of the distributor valve chamber, and to seal over the vent port 129 associated with the right end 123 of the distributor valve chamber. Accordingly, the left end 122 of the distributor valve chamber now becomes vented through port 125, the drag valve chamber 126, and the vent passage 131; and operating air is now allowed to build up at the right end 123 of the distributor valve chamber to cause the distributor valve together with its nylon plugs to shift leftward to its second position, as shown in FIG. 12. In this latter condition of the distributor valve, the rear end of the piston chamber 26 is in communication through the corresponding intake-exhaust passage 111, ports 103, and 102 of the distributor valve chamber with the vent passage 110; and the forward end of the piston chamber is in communication through the corresponding intake-exhaust passage 113, and ports 104, 92 with the air supply channel 91. Accordingly, operating air which is continually flowing in a steady thin stream from the channel port 116 to opposite ends 122, 123 of the distributor valve chamber, now also flows from the intake channel 91 in large volume through the radial ports 92 to the interior of the bushing, around the neck 142 of the distributor valve and out through the radial ports 104 to the channel 108 and the associated intake-exhaust passage 113 leading through the radial ports 114 to the forward end of the piston chamber. The operating air entering the radial ports 114 bleeds around the looseness of the piston forwardly of the seal ring 139 to the front of the piston. The radial ports 114 are also located slightly away from the front end of the piston chamber so that the piston never fully reaches the forward end of the piston chamber because of a cushion of air that becomes trapped at its forward end. Operating air now building up forwardly of the piston exerts a rearward axial pull, as earlier explained, upon the forward gripper 45 causing the latter to firmly grip the duct and hold the piston stationary, whereupon the operating air forces the housing 20 forwardly relative to the piston to the condition shown in FIGS. 1 and 11, and drags the rear gripper forwardly a corresponding distance. This forward movement of the housing relative to the piston and drag valve causes the drag valve 96 to move rearwardly in its chamber to seal from vent 131 port 125 connected to the left end 122 of the distributor valve chamber, and to communicate by means of its neck section 132 vent 129 with port 128 communicating with the right end 123 of the distributor valve chamber. Following this action of the drag valve, air building up at the left end 122 of the distributor valve chamber forces the distributor valve to the right to the position shown in FIG. 1. This operating cycle of the piston and housing, and the consequent step-by-step movement of the duct rodder through the duct continues automatically until the operator shuts off the air supply.

If, because of an obstruction in the duct, the duct rodder is prevented from advancing further, a forceful yank upon the lead line 75 in a rearward direction will cause the resilient legs of both grippers to flip over and flex in the opposite direction. This reversed condition of the legs of the grippers enables the duct rodder to travel rearwardly out of the duct. If desired the duct rodder in this reversed condition may be pulled rearwardly by means of the lead line from the duct.

It is to be noted that each of the gripping elements has six legs spaced equally apart. This number is of advantage in that each leg is opposed by another leg and thus the inward radial thrust of each leg upon the body of the gripper element is counter-balanced by that of an opposing leg. While it is preferable that the gripping strength of the forward gripper element 45 be greater for the reasons mentioned, than that of the rear one 68, nevertheless, the rear gripper element may be the same in gripping strength as the forward one and may also be the same in structure.

Figure 13:
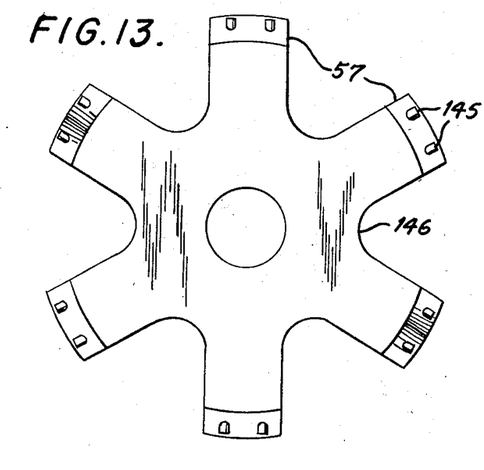
FIG. 13 discloses in elevation a modified form which a gripper element may take.
Figure 14:
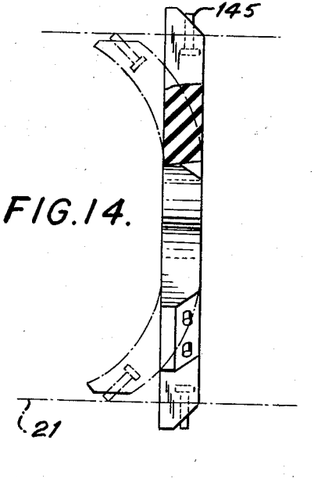
FIG. 14 is a side elevation view of FIG. 13 in association with a duct.

In FIGS. 13 and 14, shoes for the legs, such as studs 145 are shown embedded in the legs of a resilient flexible gripper 146 and projecting from the beveled surface areas 57 of its legs. The studs are formed of a wear resistant material, such as tungsten carbide. In this construction the studs are adapted to grip the duct wall. This reduces wear at the duct contacting ends of the legs and thereby prolongs the life of the gripper. The broken line in FIG. 14 shows the legs of the gripper in flexed relation to the duct 21.

The duct gripper thus far described are circular in configuration, and are preferably for use in ducts of circular cross section. It is understood that such ducts may be manufactured with diameters of different sizes. A duct of conventional size has a diameter of approximately three and one-half inches. Another conventional size duct has a diameter of approximately four inches. However, it is understood that the size of the gripper to be used with the duct rodder will be proportioned for best results to the diameter size of the duct in which it will be used, so that it will be of a diameter a little greater than that of the duct.

Besides the circular or round duct, there also are square ducts. It is preferable, when the duct rodder is to be used in a square duct, that the grippers mounted to the duct rodder be modified in the arrangement of their legs so as to provide desirable contact with the interior wall area of the duct.

Figure 15:
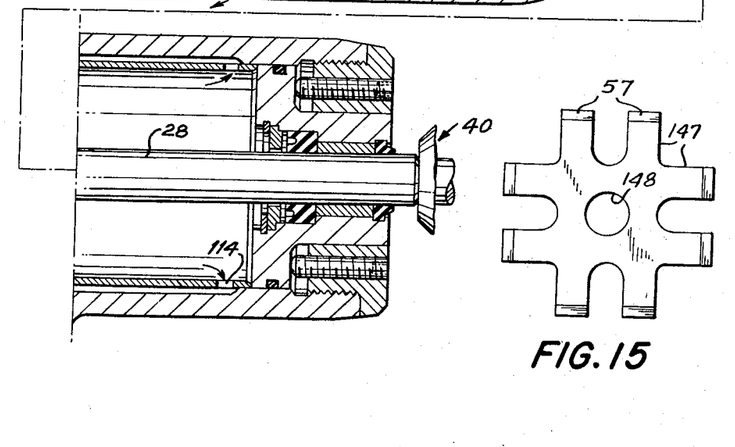
FIG. 15, which is drawn to a reduced scale, is an example of a gripper element for use in a square duct.
Figure 16:
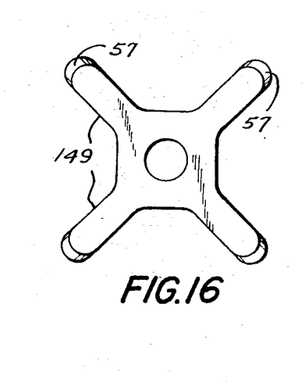
FIG. 16 is a further example of a gripper element suitable for use in a square duct.

FIGS. 15 and 16 illustrate examples of grippers which are especially suited for use in square ducts. These grippers are of a construction similar to those earlier described, except for the arrangement of their legs. The legs of these grippers may also have beveled surfaces 57; and the studs 145 shown in FIG. 13 may also be used with the legs of these grippers.

The gripper illustrated in FIG. 15 has eight legs 147, so arranged that a separate pair is engageable with a separate wall of the duct. The cross dimension of the gripper is a little greater than that of the duct in which it will be used so that the legs will be flexed into contact with the duct walls when entered into the duct.

The gripper illustrated in FIG. 16 has four legs 149 arranged substantially ninety degrees apart, which legs are designed to engage a separate corner 150 of a square duct 151. Each corner 150 of the square duct, as shown in FIG. 17, conventionally has a slight radius of curvature, and the end of each leg 149 is similarly rounded. The diagonal dimensions of the legs 149 are slightly greater than those of the square duct, so that the legs will be flexed into contact with the corners when entered into the duct. It is also understood that a gripper, not shown, similar to that shown in FIG. 16 may be formed having a leg between each of the legs 149 for contact with each side wall of the duct.

While the mounting holes 148 of the several grippers described herein are round, it is understood, however, that the mounting holes may be of polygonal form to accommodate complementary mounting supports.

What is claimed is:

1. A duct rodder for use in advancing step by step a lead line through a duct, comprising: an elongated housing of smaller cross dimension than the duct in which it is to be received having an axially extending piston chamber, a pneumatically operable piston movable in the chamber relative to the housing having a piston rod projecting externally of the forward end of the housing, a first duct gripping means mounted to the forward end of the rod for gripping the wall of the duct and holding the piston stationary when operating air is applied to the piston chamber forwardly of the piston so as to allow a forward advance of the housing relative to the piston, a second duct gripping means mounted to the rear end of the housing for gripping the wall of the duct and holding the housing stationary when operating air is applied to the piston chamber rearwardly of the piston so as to allow a forward advance of the piston relative to the housing, an operating air supply line connected to the rear end of the housing, a distributing valve chamber in the housing having intermediately of its ends a main passage connection with the supply line, a distributor valve pneumatically shiftable in the valve chamber for causing flow of operating air from the latter alternately to opposite ends of the piston chamber, and a drag valve movable as a unit with the piston controlling pneumatic shifting of the distributor valve.

2. A duct rodder as in claim 1, wherein the distributor valve has a first shifted position in which operating air flows to the piston chamber forwardly of the piston and has a second shifted position in which operating air flows to the piston chamber rearwardly of the piston.

3. A duct rodder as in claim 1, wherein a distributor valve control passage branching off from the main passage provides a continuous flow of operating air to opposite ends of the distributor valve chamber for effecting shifting of the distributor valve from one position to the other, the drag valve having a first moved position with the piston in which one end of the valve chamber is vented and the opposite end is blocked off from vent whereby pressure air is permitted to develop at the latter end to cause shifting of the distributor valve to its first position, and the drag valve having a second moved position with the piston in which said opposite end of the distributor chamber is vented and the said other end is blocked off from vent whereby pressure air is permitted to develop at the latter end to reverse the shifted position of the distributor valve to its second position.

4. A duct rodder as in claim 3, wherein the distributor valve control passage is substantially restricted relative to the main passage.

5. A duct rodder as in claim 1, wherein a separate resilient plug cushion is disposed in the distributor valve chamber adjacent each end of the distributor valve.

6. A duct rodder as in claim 1, wherein the drag valve and distributor valve move in parallel relation to each other.

7. A duct rodder as in claim 1, wherein the first position of the distributor valve a first intake-exhaust passage communicates the piston chamber at a first point short of the piston chamber's forward end through the distributor valve chamber with a first vent passage whereby upon movement of the piston forwardly beyond the said point a cushion of air becomes trapped in the piston chamber forwardly of the piston, and a second common passage connects the piston chamber at a second point short of the piston chamber's rear end through the distributor chamber with the main passage; and wherein in the second position of the distributor valve the first common passage connects the piston chamber through the distributor valve chamber with the main passage and the second intake-exhaust passage connects the piston chamber through the distributor valve chamber with a second vent passage whereby upon movement of the housing relative to the piston so as to carry the second point of the housing beyond the rear of the piston a cushion of air becomes trapped in the piston chamber rearwardly of the piston.

8. A duct rodder as in claim 1, wherein the piston rod has a neck portion projecting rearwardly of the piston and the drag valve carries a bifurcated member engaged about the said neck portion.

9. A duct rodder as in claim 1, wherein each of the first and second duct gripping means includes a duct gripping element formed of flexible resilient material which is of greater cross dimension than the duct and is adapted to flex in a rearward direction relative to the housing when the duct rodder is entered forwardly into the duct.

10. A duct rodder as in claim 9, wherein the duct gripping element of the first duct gripping means is of stiffer construction than that of the second gripping means and consequently of lesser flexibility whereby it exerts under pressure of pneumatic fluid applied to the forward end of the piston chamber a greater gripping force upon the wall of the duct than is exerted by the gripping element of the second duct gripping means under pressure of pneumatic fluid applied to the rear end of the piston chamber.

11. A duct rodder as in claim 9, wherein at least one of the gripping elements is of uniform axial thickness and is formed of a tough plastic material.

12. A duct rodder as in claim 9, wherein the gripping element is defined by a central body having a plurality of legs extending from the body in the same plane as the body.

13. A duct rodder as in claim 12, wherein each leg of the duct gripping element has a beveled peripheral edge facing forwardly relative to the housing adapted to contact the duct wall.

14. A duct rodder as in claim 12, wherein a wear resistant stud is embodied in each leg, projects through the periphery of the leg and is adapted upon flexing of the leg in a particular direction to engage the duct wall.

15. For use with a duct rodder having an axially extending support, a one-piece resilient and flexible duct gripping element axially mountable to the support and having a greater cross dimension than the duct rodder, the duct gripping element being defined by a central body having front and rear faces perpendicular to its axis and a plurality of legs extending integrally from the body, the legs having front and rear faces respectively co-planar with the corresponding faces of the body, wherein a wear resistant stud engageable with the wall of a duct in which the duct gripping element may be received is mounted to the end area of each leg.

16. In a duct rodder movable in step by step fashion through a duct, including a housing of lesser diameter than the duct, a piston supported in the housing having a rod projecting from the housing, and means for moving the housing and piston linearly relative to one another; a first one-piece resilient and flexible duct gripper of greater diameter than the duct axially mounted to the rod and having front and rear faces perpendicular to its axis; a second duct gripper of similar structure axially mounted to the housing; each gripper being flexible selectively forwardly or rearwardly relative to its mounting, adapted when entered in a selected direction in a duct to flex under resistance of the duct wall in the opposite direction; each gripper adapted when pressured axially in a direction corresponding to the direction in which the gripper is flexed to expand outwardly to grip the duct wall so as to restrain the corresponding housing or rod against linear movement in the direction in which said pressure is being applied, and each gripper adapted when pressured axially in a direction opposite to the direction in which the gripper is flexed to contract inwardly so as to relax its grip relative to the duct wall and as a consequence allow linear movement of the corresponding housing or piston in the direction in which the pressure is being applied; and trailing lead line means movable with the housing having a connection with the housing in close proximity to its axis for selectively reversing the flexed condition of both grippers after they have been entered into the duct upon application of a strong force to the lead line in an axial direction corresponding to the direction in which the grippers may then be flexed.

17. For use with a duct rodder having an axially extending support, a one-piece resilient and flexible duct gripping element axially mountable to the support and having a greater cross dimension than the duct rodder, the duct gripping element being defined by a central body having front and rear faces perpendicular to its axis and a plurality of legs extending integrally from the body, the legs having front and rear faces respectively co-planar with the corresponding faces of the body, wherein each leg has a peripheral beveled forward edge.

18. A duct gripping element as in claim 17, wherein a wear resistant stud is embodied in the beveled edge of each leg and projects externally of said edge.

19. A duct rodder designed to travel step by step through a duct, including a motor comprising a housing and a piston means, one movable axially relative to the other when the other is held stationary; and means cooperable with the wall of the duct for holding the housing and piston alternately stationary so as to permit alternate axial movement of one relative to the other, the said means comprising a pair of resilient flexible one-piece grippers of greater diameter than the duct, one fixed to the housing and the other fixed to the piston means, each gripper being flexible selectively forwardly or rearwardly of its mounting, both grippers adapted when entered into the duct to be forced by the surrounding duct wall to flex in a particular direction, trailing lead line means connected to the housing in close proximity to the axis of the housing for selectively forcing the grippers while in the duct to flex in a reverse direction upon application of a strong force to the lead line in a direction corresponding to the direction in which the grippers may then be flexed and each gripper regardless of the direction in which it is flexed in the duct being adapted when pressured axially in one direction to expand radially and grip the duct wall so as to hold the corresponding housing or piston means as the case may be stationary, and adapted when axially pressured in the opposite direction to yieldably relax its grip on the duct wall so as to allow the corresponding housing or piston means as the case may be to move axially relative to the other.

References Cited

UNITED STATES PATENTS

| | | | |
|---|---|---|---|
| 1,516,880 | 11/1924 | Bowman | 15—104.06 |
| 2,518,330 | 8/1950 | Jasper et al. | 254—134.5 |
| 2,917,762 | 12/1959 | Xenis | 254—134.6 X |
| 2,974,932 | 3/1961 | Xenis | 254—134.5 |
| 3,137,195 | 6/1964 | Rosenberg | 85—10 |
| 3,224,734 | 12/1965 | Hill | 254—134.6 |

FOREIGN PATENTS 614,592  12/1948  Great Britain.

OTHELL M. SIMPSON, *Primary Examiner.*